United States Patent
Parris et al.

(10) Patent No.: US 8,229,263 B2
(45) Date of Patent: Jul. 24, 2012

(54) OPTICAL FIBER CABLE HAVING A DEFORMABLE COUPLING ELEMENT

(75) Inventors: Don Parris, Newton, NC (US); Greg DeChristopher, Hickory, NC (US); Justin Elisha Quinn, Newton, NC (US)

(73) Assignee: Draka Comiteq, B.V., Amsterdam (NL)

( * ) Notice: Subject to any disclaimer, the term of this patent is extended or adjusted under 35 U.S.C. 154(b) by 0 days.

(21) Appl. No.: 13/253,526

(22) Filed: Oct. 5, 2011

(65) Prior Publication Data

US 2012/0027366 A1 Feb. 2, 2012

Related U.S. Application Data

(62) Division of application No. 12/643,222, filed on Dec. 21, 2009, now Pat. No. 8,036,509, which is a division of application No. 12/146,526, filed on Jun. 26, 2008, now Pat. No. 7,639,915.

(60) Provisional application No. 60/946,744, filed on Jun. 28, 2007.

(51) Int. Cl.
*G02B 6/44* (2006.01)

(52) U.S. Cl. .................................. 385/114; 385/109

(58) Field of Classification Search ........... 385/100–115
See application file for complete search history.

(56) References Cited

U.S. PATENT DOCUMENTS

| | | |
|---|---|---|
| 3,879,575 A | 4/1975 | Dobbin et al. |
| 4,201,607 A | 5/1980 | Rautenberg et al. |
| 4,332,655 A | 6/1982 | Berejka |
| 4,382,005 A | 5/1983 | Miller |
| 4,464,013 A | 8/1984 | Sabia |
| 4,497,538 A | 2/1985 | Patel |
| 4,593,442 A | 6/1986 | Wright et al. |
| 4,701,016 A | 10/1987 | Gartside, III |
| 4,709,982 A | 12/1987 | Corne et al. |
| 4,726,649 A | 2/1988 | Funaki et al. |
| 4,818,060 A | 4/1989 | Arroyo |
| 4,852,965 A | 8/1989 | Mullin et al. |
| 4,859,024 A | 8/1989 | Rahman |
| 4,943,383 A | 7/1990 | Avery et al. |
| 5,050,959 A | 9/1991 | Randisi |
| 5,177,809 A | 1/1993 | Zeidler |
| 5,285,008 A | 2/1994 | Sas Jaworsky et al. |
| 5,358,664 A | 10/1994 | Brauer |
| 5,621,842 A | 4/1997 | Keller |
| 6,108,473 A | 8/2000 | Beland et al. |
| 6,151,434 A | 11/2000 | Bonicel |

(Continued)

OTHER PUBLICATIONS

Kraton, Typical Properties Guide, copyright 2006, downloaded from the web on Mar. 26, 2007, pp. 1-16.

*Primary Examiner* — Daniel Petkovsek
(74) *Attorney, Agent, or Firm* — Summa, Additon & Ashe, P.A.

(57) ABSTRACT

Disclosed is an optical fiber cable that includes optical fibers and a deformable coupling element enclosed within a buffer tube. The coupling element is formed from a deformable yet substantially incompressible material that is capable of releasably and intermittently coupling the optical fibers to the buffer tube in various orientations. The design of the coupling element layer permits coupling of the optical fibers to the buffer tube without the use of a compressive cushioning layer and yet permits localized movement the optical fibers relative to the buffer tube to account for disparate thermal expansion and to accommodate optical fiber placement.

18 Claims, 6 Drawing Sheets

U.S. PATENT DOCUMENTS

| | | |
|---|---|---|
| 6,226,431 B1 | 5/2001 | Brown et al. |
| 6,229,944 B1 * | 5/2001 | Yokokawa et al. ............ 385/114 |
| 6,278,826 B1 * | 8/2001 | Sheu .............................. 385/109 |
| 6,295,401 B1 | 9/2001 | Rutterman et al. |
| 6,374,023 B1 | 4/2002 | Parris |
| 6,463,199 B1 | 10/2002 | Quinn et al. |
| 6,475,963 B1 | 11/2002 | Bloch et al. |
| 6,529,662 B1 * | 3/2003 | Kobayashi et al. ............ 385/112 |
| 6,654,525 B2 | 11/2003 | Nechitailo et al. |
| 6,744,955 B2 | 6/2004 | Nechitailo et al. |
| 6,748,146 B2 | 6/2004 | Parris |
| 6,749,446 B2 | 6/2004 | Nechitailo |
| 6,778,745 B2 | 8/2004 | Debban, Jr. et al. |
| 6,970,629 B2 | 11/2005 | Lail et al. |
| 7,006,740 B1 | 2/2006 | Parris |
| 7,024,081 B2 | 4/2006 | Dowd et al. |
| 7,254,303 B2 | 8/2007 | Parsons |
| 7,639,915 B2 | 12/2009 | Parris et al. |
| 7,646,952 B2 | 1/2010 | Parris |
| 7,724,998 B2 | 5/2010 | Parris et al. |
| 8,036,509 B2 | 10/2011 | Parris et al. |
| 8,036,510 B2 | 10/2011 | Parris |
| 2003/0086665 A1 | 5/2003 | Nechitailo et al. |
| 2004/0120666 A1 * | 6/2004 | Chalk et al. .................... 385/114 |
| 2004/0208462 A1 * | 10/2004 | Parsons et al. ................. 385/100 |
| 2004/0213529 A1 | 10/2004 | Dowd et al. |
| 2005/0213902 A1 | 9/2005 | Parsons |
| 2008/0279514 A1 | 11/2008 | Kundis et al. |
| 2009/0003779 A1 | 1/2009 | Parris |
| 2009/0003781 A1 | 1/2009 | Parris et al. |
| 2009/0003785 A1 | 1/2009 | Parris et al. |
| 2010/0098387 A1 | 4/2010 | Parris |
| 2010/0098388 A1 | 4/2010 | Parris et al. |
| 2010/0232753 A1 | 9/2010 | Parris et al. |
| 2012/0027366 A1 | 2/2012 | Parris et al. |

* cited by examiner

OPTICAL FIBER CABLE HAVING A DEFORMABLE COUPLING ELEMENT

CROSS-REFERENCE TO PRIORITY APPLICATIONS

This application is a division of commonly assigned U.S. patent application Ser. No. 12/643,222 for an Optical Fiber Cable Having a Deformable Coupling Element, filed Dec. 21, 2009 (and published Apr. 22, 2010, as Publication No. 2010/0098388 A1), now U.S. Pat. No. 8,036,509, which itself is a division of commonly assigned U.S. patent application Ser. No. 12/146,526 for an Optical Fiber Cable Having a Deformable Coupling Element, filed Jun. 26, 2008 (and published Jan. 1, 2009, as Publication No. 2009/0003781 A1), now U.S. Pat. No. 7,639,915, which itself claims the benefit of U.S. Provisional Patent Application Ser. No. 60/946,744, for an Optical Fiber Cable Having a Deformable Coupling Element (filed Jun. 28, 2007). Each of the foregoing patent applications and patent application publications is hereby incorporated by reference in its entirety.

FIELD OF THE INVENTION

The invention relates to an optical fiber cable that contains optical fibers inside a buffer tube.

BACKGROUND

Optical fiber cables are used to transmit information including telephone signals, television signals, data signals, and Internet communication. To preserve the integrity of the signal transported by optical fiber cables, certain design factors warrant consideration.

First, forces may develop on the optical fibers due to contact with rough, hard, or uneven surfaces within the optical fiber cables. Such contact, for example, may result from thermal cable expansion or contraction, which can cause microbending and macrobending effects. This, in turn, can lead to signal attenuation or signal loss. Layers of protective coatings and claddings around the optical fibers can help to reduce the forces that cause these unwanted effects.

Second, the optical fibers are typically coupled to the surrounding buffer tube in some way. This coupling prevents the optical fibers from pulling back inside the buffer tube as a result of processing, installation, handling, or thermally induced dimensional changes. Not only can these effects hamper accessibility to the fibers during connection operations (e.g., splicing), but also insufficient coupling can lead to excess and/or unevenly distributed optical fiber length (e.g., optical fibers accumulating in a confined space). Such accumulation may cause bending or otherwise force contact between the optical fibers and other cable elements, which can likewise lead to microbending and macrobending.

Third, optical fiber cables are typically used with electronic devices. If water intruding into the cables can spread (e.g., flow) along the length of the cables to these electronic devices, severe damage to the electronic systems may result. It is also thought that the formation of ice within an optical fiber cable can impose onto the optical fibers localized microbending-inducing forces or macrobending-inducing forces. Fillers and water-blocking layers within the cables can impede the movement of water within the cables and thereby limit such damage.

The undesirable effects of signal loss, coupling failure, and water damage can be reduced through the use of protective layers and coupling elements. The addition of these layers, however, can lead to larger cables, which are not only more costly to produce and store but also heavier, stiffer, and thus more difficult to install.

Manufacturers have typically addressed these problems by employing water-blocking, thixotropic compositions (e.g., grease or grease-like gels). For example, filling the free space inside a buffer tube with water-blocking, petroleum-based filling grease helps to block the ingress of water. Further, the thixotropic filling grease mechanically (i.e., viscously) couples the optical fibers to the buffer tube.

That usefulness notwithstanding, such thixotropic filling greases are relatively heavy and messy, thereby hindering connection and splicing operations. Consequently, filling greases carry certain disadvantages.

Various designs for dry cables have been developed to eliminate filling greases while providing water-blocking and coupling functions. For example, in a totally dry cable, filling grease may be replaced by a water-swellable element (e.g., tape or yarn carrying a water-swellable material).

Unfortunately, in practice, the water-swellable elements used in these designs may not provide for sufficient coupling of the optical fibers to the buffer tube. That is, the optical fibers are free to pull back inside the cable when the cable is installed or exposed to temperature extremes.

Purported solutions to this problem have been proposed, typically involving the inclusion of a cushioning material, such as polymeric foam (e.g., polyurethane foam), that either surrounds the optical fibers or is layered on the water-swellable tape. To achieve the desired mechanical coupling, though, the cushioning is sized such that it is compressed between the optical fibers and the buffer tube. In this way, the cushioning promotes frictional coupling of the optical fibers to the buffer tube.

Although frictional coupling is effective in preventing relative movement between the optical fibers and the buffer tube, the optical fibers may experience microbending or macrobending when the buffer tube contracts due to cooling. This may result in optical signal attenuation or signal loss. Further, the coupling pressure exerted on the optical fibers by the foam cushioning may diminish over time due to the relaxation or degradation of the polymeric foam.

Accordingly, there is a need for a dry optical fiber cable in which optical fibers are coupled to a buffer tube in a way that does not exert undue stresses on the optical fibers and is reliable over the life span of the cable.

SUMMARY OF THE INVENTION

In one aspect, the invention embraces a cable structure that provides coupling between buffer tubes and optical fiber elements. In this aspect, the present invention includes a coupling element that is bonded to one of the material layers in the cable, such as the inner wall of a buffer tube or a water-swellable tape layer.

This coupling element is made of a sufficiently elastic material so as to deform under the load of the optical fiber element (e.g., having elongation to break of at least about 100 percent at standard temperature and pressure) and has sufficient strength so as not to tear under the weight of the optical fiber element (e.g., having tensile strength of at least about 100 psi at standard temperature and pressure). It is typically dry. Moreover, the coupling element is sized so as to not fill the entire space between the buffer tube and the optical fiber element. Consequently, the coupling element typically contacts the optical fiber element at discrete locations along the length of the optical fiber element.

For example, under normal circumstances (e.g., horizontal cable placement), the optical fiber element contacts the deformable profile of the coupling element at distinct points along the length of the optical fiber element. (Stated differently, the optical fiber element will typically not rest upon the coupling element in a fully extended form). The contact points between the optical fiber element and the coupling element are not fixed and will typically change if there is movement of a cable component (e.g., thermal contraction of the buffer tube.) The optical fiber element's intermittent contact (i.e., discontinuous contact) with the coupling element is caused in part by the tendency of the optical fiber element to assume a non-linear (e.g., curved) orientation within the buffer tube.

Free space between the optical fiber element and the other components (e.g., layers) within the buffer tube allows the optical fiber element to move more or less freely within the cable. For example, although the glass of the optical element and the plastic of the buffer tube may respond differently to thermal loads, the optical fiber element is not fixedly secured to the coupling element or buffer tube. Consequently, the optical fiber element is not forced to move as the buffer tube thermally expands and contracts.

This free space can also cause problems, however, if the optical fiber element is not adequately coupled to the buffer tube. For example, under vertical placement, an optical fiber element having at least some excess optical fiber length can assume a generally non-linear orientation within the cable (e.g., helical, sinusoidal, or often non-uniform orientation) and will tend to bunch, slump, gather, or otherwise collect at lower portions of the cable (i.e., because of gravitational pull). This bunching, slumping, gathering, and collecting (i.e., excess length) can lead to bending and other pressures that can cause signal attenuation.

The design of the coupling element according to the present invention helps to reduce such undesirable collection. At discrete (but non-fixed) locations along the length of the optical fiber cable, the optical fiber element will contact the coupling element (in part due to the non-linear form that the optical fiber element assumes because of excess length). Under such conditions, the coupling element will deform under the applied force of the optical fiber element, thereby creating a shelf-like protrusion (e.g., a bulge) that helps to support the optical fiber element. This deformation can be modest or substantial depending, of course, upon the particular characteristics of the coupling element and the applied force.

It is thought that the support provided by this shelf-like deformation has an axial normal force component in addition to any radial normal force and frictional force. In contrast to the frictional coupling provided by compressed cushioning layers, the optical fiber element contacts the other elements in the buffer tube only at discrete locations rather than along the entire length of the optical fiber element. As a result, the design of the coupling element according to the present invention limits the occurrence of the kinds of unwanted pressures that can cause microbending or macrobending in the optical fiber element.

The design of the coupling element, therefore, serves to couple the optical fiber element to the buffer tube without the use of a compressive, frictional cushioning layer. In addition, the optical fiber cable according to the present invention allows the optical fiber element to move relative to the buffer tube on a small, localized scale. This, in turn, helps to minimize the development of pressures on the optical fibers that can occur from cable placement or from disparate thermal expansion of the cable components.

The foregoing, as well as other characteristics and advantages of the invention and the manner in which the same are accomplished, is further specified within the following detailed description and its accompanying drawings.

DETAILED DESCRIPTION

The present invention is described herein with reference to the accompanying drawings. As will be appreciated by those having ordinary skill in the art, these drawings are schematic representations, which are not necessarily drawn to scale. This invention may be embodied in many different forms and should not be construed as limited to the embodiments set forth herein. The embodiments disclosed are provided to convey the scope of the invention to those having skill in the relevant art.

In one aspect, the invention embraces an optical fiber cable that provides satisfactory coupling of optical fibers and a surrounding buffer tube but in a way that reduces unwanted microbending and macrobending effects. In another aspect, the invention embraces methods of making such optical fiber cables.

Figure 1:
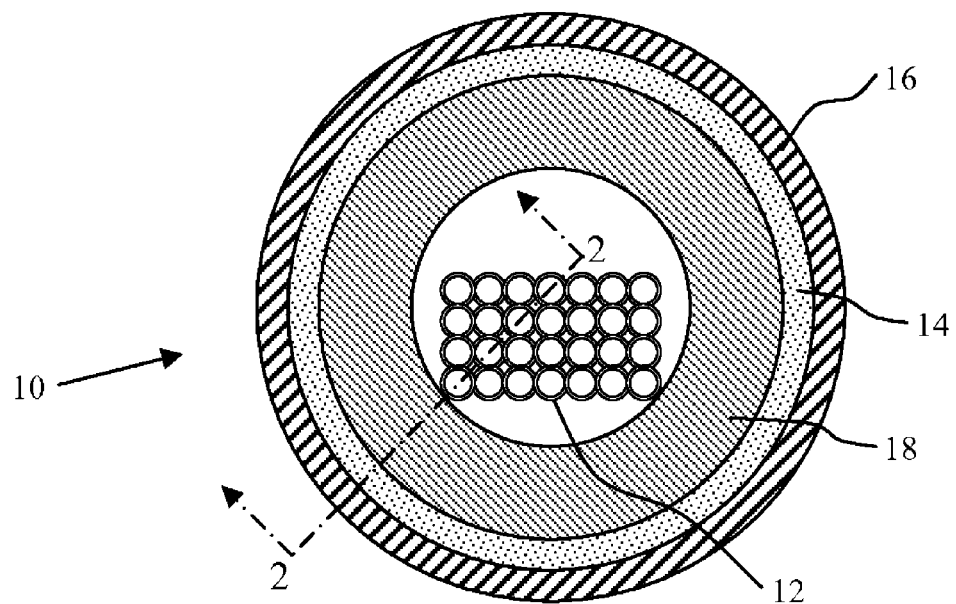
FIG. 1 depicts a cross-sectional view of an optical fiber cable according to one embodiment of the present invention.

FIG. 1 depicts a cross-sectional view of one embodiment of an optical fiber cable 10 according to the present invention. In this exemplary embodiment, an optical fiber element 12 is disposed within a buffer tube 16. The optical fiber element 12 itself includes at least one optical fiber, typically a plurality of optical fibers (e.g., a ribbon stack). The optical fiber element 12 is typically manufactured with rotational twist.

In this exemplary embodiment, a water-swellable element 14 (e.g., a water-blocking material) is positioned adjacent to the inner wall of the buffer tube 16 between the optical fiber element 12 and the inner wall of the buffer tube 16. The water-swellable element 14 helps to block the ingress of water into the core of the optical fiber cable 10 or, if water intrusion occurs, helps to prevent the movement of water along the length of the optical fiber cable 10. The water-swellable element 14 may be secured to the buffer tube 16, for example, by an adhesive, by melt-bonding part of the water-swellable element 14 to the buffer tube 16 during extrusion, or by frictional coupling of the water-swellable element 14 and the buffer tube 16.

Further referencing the exemplary embodiment of FIG. 1, a coupling element 18 is positioned adjacent to the optical fiber element 12 (i.e., between the optical fiber element 12 and the buffer tube 16). As depicted in FIG. 1, the coupling element 18 is configured (e.g., sized) to provide sufficient coupling space to accommodate the optical fiber element 12 without forced contact. In other words, the optical fiber element 12 can fit within the coupling element 18 such that there is free space between the optical fiber element 12 and the coupling element 18 around the full perimeter of the optical fiber element 12 (i.e., "annular free space").

Figure 2:
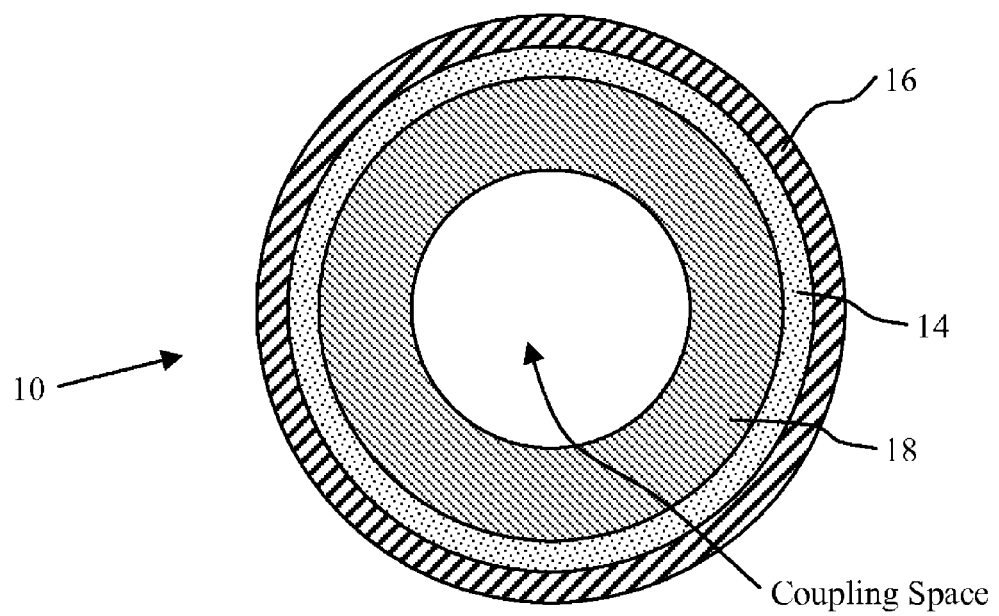
FIG. 2 depicts a cross-sectional view of an optical fiber cable according to one embodiment of the present invention to illustrate the optical fiber cable's coupling space.

As used herein, the concept of "coupling space" refers to the inner cable region (i.e., the free space) in which the optical fiber element 12 is positioned. FIG. 2 illustrates the "coupling space" of the optical fiber cable 10 depicted in FIG. 1. (For clarity, FIG. 2 omits the optical fiber element 12.) As will be recognized by those having ordinary skill in the art, the coupling space is typically defined by the configuration of the coupling element 18.

Moreover, as used herein in this context, the term "annular free space" is intended to characterize unfilled space that can exist between the optical fiber element 12 and its surrounding elements (e.g., the coupling element 18) around the entire perimeter of the optical fiber element 12, regardless of the respective shapes of the optical fiber cable 10 and its components (e.g., a rectangular ribbon stack within a round coupling insert as depicted in FIG. 1). In this regard, the term "annular free space" as used herein is not limited to the regular gap between two concentric tubes (or casings) having circular cross-sections (i.e., a perfect annulus).

Figure 3:
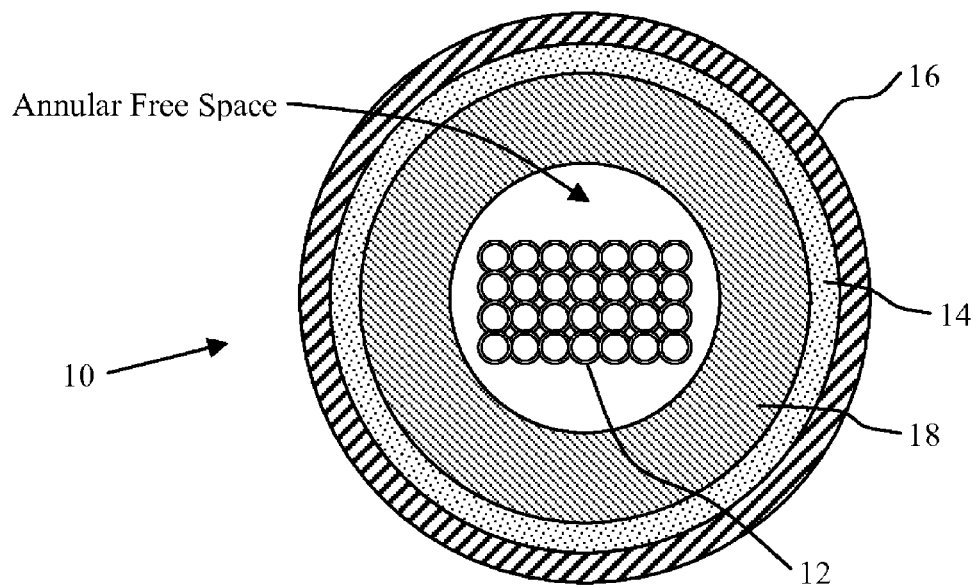
FIG. 3 depicts a cross-sectional view of an optical fiber cable according to one embodiment of the present invention to illustrate the annular free space between the optical fiber element and its surrounding elements.

Likewise, FIG. 3 demonstrates how the optical fiber cable 10 of FIG. 1 can define "annular free space" surrounding the optical fiber element 12 (and thereby satisfy the concept of "annular free space" as used herein). In general, an optical fiber element 12 that is sized and configured to fit within a buffer tube 16 in a way that does not require contact with its surrounding elements—typically the coupling element 18—will be capable of defining annular free space within the optical fiber cable 10 (i.e., contact-free placement).

Those having ordinary skill in the art will understand that the formation of annular free space will occur, if at all, over discrete segments of the optical fiber cable 10. Over any extensive length of the optical fiber cable 10, some contact between the optical fiber element 12 and the coupling element 18 is virtually assured (i.e., optical cables as used in the field are subjected to bending). (Indeed, as discussed herein, it is interference contact that promotes advantageous coupling of the optical fiber element 12 and buffer tube 16.) To the extent the optical fiber element 12 and the coupling element 18 are capable of defining annular free space around the entire perimeter of the optical fiber element 12, annular free space will likely be present within the optical fiber cable 10, thereby reducing unwanted microbending and macrobending effects.

The coupling element 18 according to the present invention is made of a coupling material that is substantially incompressible but that will readily deform under light loading. An exemplary coupling element 18 is a coupling tape, though the coupling element 18 can be formed in-situ, such as via melt extrusion.

By way of example, this coupling material possesses excellent elasticity; at standard temperature and pressure, it has an elongation to break of at least about 100 percent, typically at least about 250 percent, and more typically at least about 500 percent. In some instances, the coupling composition may possess an elongation to break of at least about 1,000 percent or more (e.g., about 1,500 percent). Furthermore, this deformable but substantially incompressible material is tear resistant and durable; at standard temperature and pressure it has tensile strength of at least about 100 psi and typically at least about 400 psi. In some instances, the coupling material may possess a tensile strength of about 1,000 psi or more.

As used herein, standard temperature and pressure refers to testing conditions of 50 percent relative humidity at 70° F. (i.e., about 20° C.) and atmospheric pressure (i.e., 760 torr).

Furthermore, the coupling element 18 itself is generally structured to deform rather than to compress when subjected to applied force. For instance, the coupling element 18 is typically not a compressible foam adjacent to the optical fiber element 12 (i.e., the innermost portion of the coupling element 18 where dynamic coupling of the optical fiber element 12 occurs).

Those having ordinary skill in the art will appreciate that, as a general matter, solids are incompressible. Many seemingly solid structures (i.e., colloidal foams) will compress under pressure. This apparent compression, however, is thought to be the result of either compression (e.g., closed-cell foams) or ejection (e.g., open-cell foams) of entrained gas bubbles rather than compression of the solid material itself.

The coupling element 18 of the present invention embraces materials that, though not compressible, will deform upon interference contact with another material object. Such deformable yet substantially incompressible materials are typically solids, but embrace non-solids, too, such as viscous liquids and cohesive gels (e.g., an oil-expanded polymeric material).

As used herein, "interference contact" is meant to describe physical contact between two objects in which one of the objects is compressed, deformed, or otherwise displaced by the other (i.e., more than mere touching).

Exemplary materials for the coupling element 18 include low-porosity solid gels, soft rubbers, soft cross-linkable silicones, and various polymers (e.g., styrene-butadiene, styrene-isoprene-styrene, styrene-ethylene/butylene-styrene, and styrene-ethylene/propylene-styrene) plasticized with mineral oils or, more typically, synthetic oils.

In this regard, plasticizers, which have an affinity for polymers, can be included in amounts between 10 and 95 weight percent. As forth herein, the present invention typically employs plasticizers at the upper end of this range (e.g., more than 50 weight percent oil).

In addition, the materials employed for the coupling element 18 can further include lubricants, which have an aversion to the polymers and plasticizers, in amounts up to about 5 weight percent. As will be known to those having ordinary skill in the art, surface migration of lubricants reduces friction between the coupling material and processing equipment, thereby facilitating polymer processing (e.g., extrusion). In general, the coupling materials for use in the present optical fiber cable 10 may include a lubricant or similar processing aid.

It has been discovered that blending super-high molecular weight polymeric materials and oils that are capable of flowing at low temperatures (i.e., possessing a low pour point) can yield soft, cohesive gels (i.e., coupling materials) that provide exceptional performance. The cohesive gels formed from these polymer/oil blends usually possess a melt flow temperature of at least about 80° C. (e.g., 90° C. or more). Typical polymer/oil blend ratios are between 30:70 and 5:95, more typically less than 15:85 (e.g., 8-12 weight percent polymer), and in some instance less than 10:90 (e.g., 5-9 weight percent polymer). The tensile strength of the cohesive gels (e.g., plasticized high-molecular weight elastomeric polymers) tends to be proportional to the weight fraction of the super-high molecular weight polymers. Elasticity (e.g., elongation to break) is roughly comparable across these aforementioned blend ranges (i.e., between about 5 and 30 weight percent super-high molecular weight polymer).

As used herein and unless otherwise specified, molecular weight refers to number-average molecular weight, rather than weight-average molecular weight.

Excellent elastomeric block copolymers for use in the present polymeric/oil blends include styrene-ethylene/butylene-styrene copolymers (i.e., with an S-EB-S block structure) having a number-average molecular weight of about 100,000 g/mol or more, and typically about 200,000 g/mol or more (as measured by gel permeation chromatography) (e.g., 200,000 to 2,000,000 g/mol). The SEBS copolymers possess excellent weatherability and, at super-high molecular weights, demonstrate elevated elongation to break. An exemplary, super-high molecular weight styrene-ethylene/butylene-styrene block copolymer is commercially available under the trade name KRATON G-1651.

As will be appreciated by those having ordinary skill in the art, super-high molecular weight elastomeric block copolymers, particularly styrene-ethylene/butylene-styrene copolymers, have not been successfully employed commercially in communication cables. Plasticizing even modest weight fractions (e.g., 3 weight percent or more) of super-high molecular weight styrene-ethylene/butylene-styrene block copolymers is exceedingly difficult, requiring unconventionally high processing temperatures (e.g., 250-350° F.). In addition, the relative high fractions of oil (e.g., more than about 70 weight percent) depress melt strength, thereby making extrusion blending and pelletizing impractical.

Further, with respect to the foregoing polymeric/oil blends, outstanding oils do not crystallize or form wax precipitates at low temperatures. Such oils typically possess a pour-point of −25° C. or less (e.g., −30 to −35° C.). Moreover, satisfactory oils used in the coupling material should plasticize the elastomeric block copolymers but not adversely affect the polymeric materials that are conventionally employed for buffer tube casings, particularly polyolefins.

Accordingly, the most acceptable oils possess low absorbability in polyethylene or polypropylene, either of which is a cost-effective polymeric material suitable for buffer tube casings. If absorbability is relatively high, conventional polyolefin buffer tubes (e.g., polyethylene or polypropylene casings) will tend to absorb excessive quantities of oil. As will be appreciated by those having ordinary skill in the art, excessive oil absorption will cause polyolefin buffer tubes to swell and, more importantly, to soften, thereby causing a loss in crush resistance.

Synthetic hydrocarbon oils, such as highly branched isoparaffinic polyalphaolefins (PAOs), perform well in this regard. Exemplary synthetic hydrocarbon oils possess a pour-point of −25° C. or less (e.g., −30° C. to −50° C.) and some −40° C. or less (e.g., −45° C. to −65° C.)

In addition, exemplary synthetic hydrocarbon oils possess an absorbability in polyethylene and/or polypropylene of less than 20 percent, typically less than 15 percent (e.g., 8-12 percent), more typically less than 10 percent (e.g., 4-8 percent), and most typically less than 5 percent (e.g., 2-3 percent). As used herein, the concept of absorbability describes an oil's ability at 85° C. to saturate a particular polymer and is measured by that polymer's weight percent increase as a result of oil absorption to saturation. For instance, an oil having 7 percent absorbability in polypropylene means that a 100 gram sample of polypropylene absorbs 7 grams of oil at about 85° C.

The synthetic hydrocarbon oils (e.g., PAOs) typically possess a viscosity of 2-40 centistokes at 100° C., more typically 5-9 centistokes at 100° C. (e.g., 6-8 centistokes at 100° C.). An exemplary synthetic oil is available from Chevron Phillips under the trade name SYNFLUID PAO.

In accordance with the foregoing, one exemplary cohesive gel for use as a coupling material is formed from a blend of super-high molecular weight styrene-ethylene/butylene-styrene (SEBS) copolymers (e.g., possessing a number-average molecular weight of about 200,000 g/mol or higher) and synthetic hydrocarbon oils, particularly polyalphaolefins (PAOs), having a pour-point of less than about −25° C. (e.g., −35° C. or less) and an absorbability in polyethylene and/or polypropylene of less than about 10 percent (e.g., 1-4 percent). For instance, a PAO oil having a viscosity of about 6 centistokes at 100° C. possesses a pour-point of −63° C.

Another cohesive gel is formed from a blend of the high molecular weight styrene-ethylene/butylene-styrene (SEBS) copolymers and synthetic hydrocarbon oils having (i) a pour-point of less than about −15° C. and an absorbability in polyethylene and/or polypropylene of less than about 5 percent (e.g., 2-3 percent) and/or (ii) a pour-point of less than −35° C. and an absorbability in polyethylene and/or polypropylene of less than about 15 percent (e.g., 2-3 percent).

In accordance with the foregoing, these exemplary embodiments of the polymer/oil cohesive gel can be formed by blending (i) between about 5 and 15 weight percent (e.g., 7-13 weight percent) of the super-high molecular weight styrene-ethylene/butylene-styrene block copolymers, such as those available under the trade name KRATON G-1651 and (ii) at least about 85 weight percent of a polyalphaolefinic synthetic oil having a viscosity of 5-8 centistokes at 100° C., such as that available under the trade name SYNFLUID PAO.

One or more of the foregoing coupling materials are disclosed in U.S. Provisional Patent Application Ser. No. 60/946,754, for Coupling Composition for Optical Fiber Cables (filed Jun. 28, 2007) and U.S. patent application Ser. No. 12/146,588, for Coupling Composition for Optical Fiber Cables, filed Jun. 26, 2008 (and published Jan. 1, 2009, as Publication No. 2009/0003785 A1), each of which is hereby incorporated by reference in its entirety.

In accordance with the foregoing, the thickness of the coupling element 18 is sized relative to the optical fiber element 12 so as to create a gap within the buffer tube 16 (e.g., between the optical fiber element 12 and the other elements that make up the optical fiber cable 10). Those having ordinary skill in the art will recognize that a gap around the entire perimeter of the optical fiber element 12 constitutes annular free space.

With reference to FIG. 3, the sum of the thicknesses of the elements positioned within the buffer tube 16 (i.e., the optical fiber element 12, the water-swellable element 14, and the coupling element 18) is less than the inside diameter of the buffer tube 16. This gap within the buffer tube 16 helps to reduce undesirable (and perhaps unnecessary) contact points, thereby controlling unnecessary contact pressures from being exerted on the optical fiber element 12. Accordingly, the coupling element 18 does not compress the optical fiber element 12 under most operational circumstances.

Additionally, the gap allows the optical fiber element 12 to move axially on a small, localized scale with respect to the buffer tube 16. This helps prevent the kinds of bunching of the optical fiber element 12 that can lead to microbending and macrobending. At the same time, though, the coupling provided by the coupling element 18 prevents substantial lengthwise movement of the optical fiber element 12 within the buffer tube 16.

Figure 4:
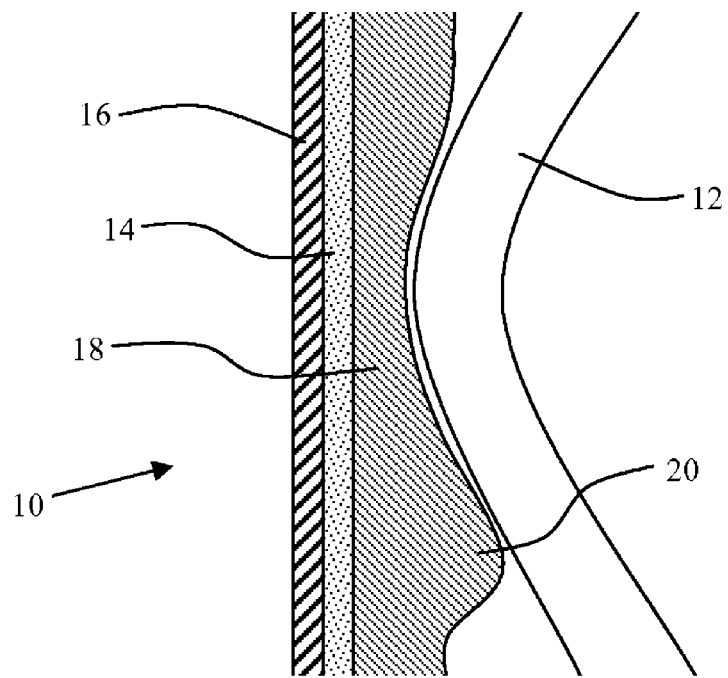
FIG. 4 depicts a partial sectional view of an inner wall of the optical fiber cable according to the present invention along line 2-2 of FIG. 1.

FIG. 4 depicts a partial sectional view of the inner wall of the optical fiber cable 10 according to the present invention along line 2-2 of FIG. 1. A buffer tube 16 surrounds a water-swellable element 14, which in turn surrounds a deformable yet substantially incompressible coupling element 18. These layers enclose an optical fiber element 12 to form the optical fiber cable 10.

In particular, FIG. 4 illustrates deformation of the coupling element 18 under forces applied by the optical fiber element 12 (e.g., interference contact). The material displaced by the imposition of the optical fiber element 12 into the deformable profile of the coupling element 18 temporarily forms a protruding shelf-like structure 20, which can restrict axial movement of the optical fiber element 12 within the buffer tube 16. In this way, the coupling element 18 serves to dynamically couple the optical fiber element 12 to the buffer tube 16.

Those having ordinary skill in the art will appreciate that the optical fiber cable 10 of the present invention can be viewed as including a central cable core positioned within a buffer tube 16. The core itself contains the optical fiber element 12, which is at least partly positioned within the coupling element 18. In accordance with the present invention, at one or more cross-sections of the optical fiber cable 10, the coupling element 18 defines a minimum coupling diameter that is greater than the maximum cross-sectional width of the optical fiber element 12. See FIG. 3.

The core may further include a water-swellable element 14, which is positioned adjacent to the coupling element 18, typically opposite the optical fiber element 12. See FIG. 3. The water-swellable element 14 helps to block the ingress of water into the core or, if water intrusion occurs, to impede the flow of water along the length of the optical fiber cable 10.

As noted, the structure and composition of the coupling element 18 allows it to deform upon interference contact with the optical fiber element 12 to create a shelf-like protrusion 20 (e.g., a bulge) that opposes axial movement of the optical fiber element 12 with respect to the buffer tube 16.

Figure 6:
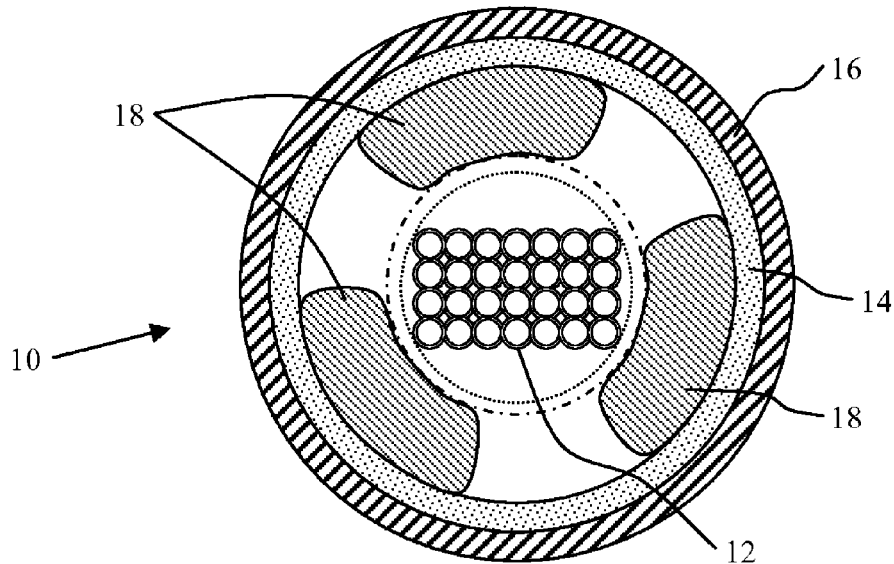
FIG. 6 depicts a cross-sectional view of an optical fiber cable according to another embodiment of the present invention.
Figure 7:
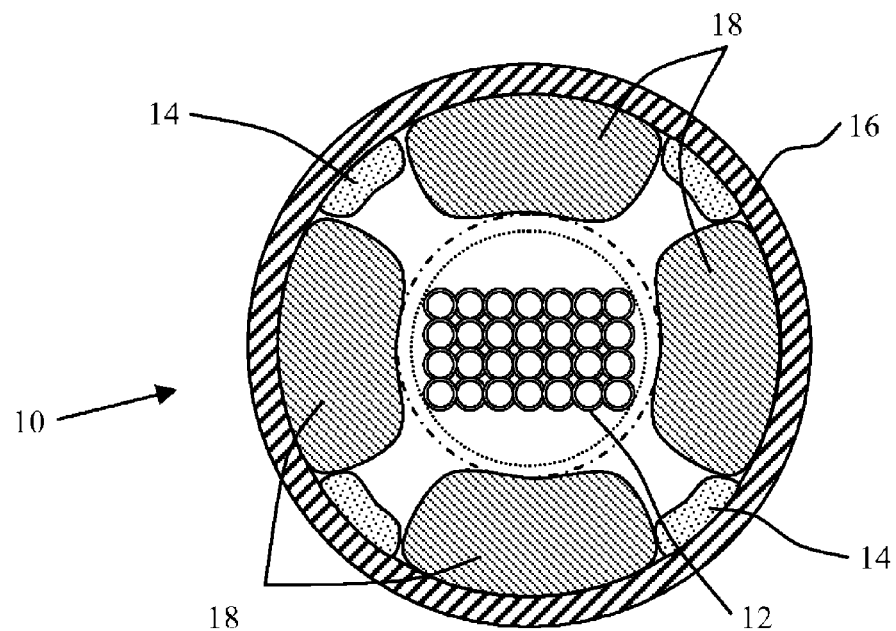
FIG. 7 depicts a cross-sectional view of an optical fiber cable according to yet another embodiment of the present invention.

FIGS. 6 and 7 depict cross-sectional views of alternative embodiments of the present invention. In these embodiments, the coupling element 18 includes multiple strips or beads of coupling material positioned intermittently around the optical fiber element 12. These alternative embodiments are intended to illustrate the variety of configurations embraced by the present invention.

In the exemplary cable embodiment depicted in FIG. 6, an optical fiber element 12 is disposed within a buffer tube 16. A water-swellable element 14 is positioned adjacent to the inner wall of the buffer tube 16 between the optical fiber element 12 and the inner wall of the buffer tube 16. Three strips of a deformable yet substantially incompressible material, working together as a coupling element 18, are intermittently positioned adjacent to the optical fiber element 12 between the optical fiber element 12 and the water-swellable element 14.

In another exemplary cable embodiment depicted in FIG. 7, an optical fiber element 12 is disposed within a buffer tube 16. Alternating strips (or beads) of a coupling element 18 and a water-swellable element 14 are positioned adjacent to the inner wall of the buffer tube 16 between the optical fiber element 12 and the inner wall of the buffer tube 16. Typically, the coupling element 18 itself is deformable yet substantially incompressible.

In one particular embodiment, the invention embraces an optical fiber cable 10 containing an optical fiber element 12 enclosed with a buffer tube 16. The optical fiber element 12 includes at least one optical fiber (e.g., a single optical fiber, at least two optical fibers twisted together, or a ribbon stack). A coupling element 18 made up of a deformable yet substantially incompressible material is positioned between the optical fiber element 12 and the buffer tube 16. Typically, the coupling element 18 itself is substantially incompressible.

The coupling element 18 serves to couple the optical fiber element 12 to the buffer tube 16. The optical fiber cable 10 may further include a water-swellable element 14 (e.g., a water-swellable tape) disposed between the buffer tube 16 and the coupling element 18.

Figure 8:
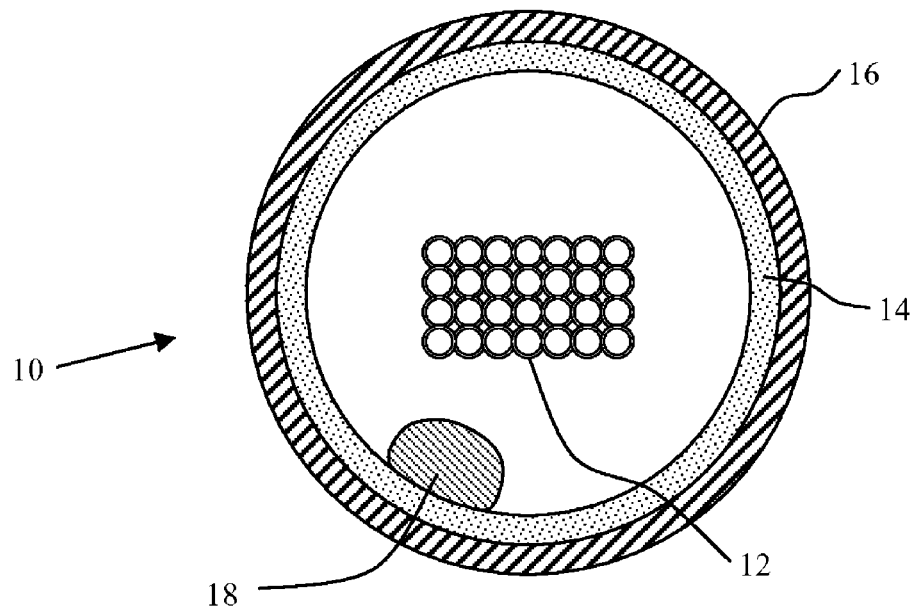
FIG. 8 depicts a cross-sectional view of an optical fiber cable according to yet another embodiment of the present invention.
Figure 9:
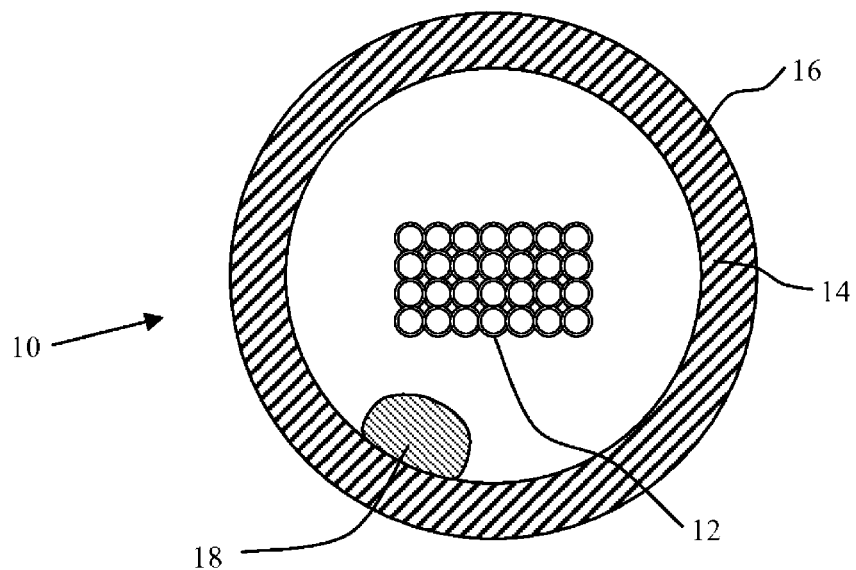
FIG. 9 depicts a cross-sectional view of an optical fiber cable according to yet another embodiment of the present invention.

FIGS. 8 and 9 depict cross-sectional views of further alternative embodiments of the present invention.

In these embodiments, the coupling element 18 is a strip (or bead) formed from the deformable yet substantially incompressible coupling material. The coupling element 18 is positioned between the optical fiber element 12 and the inner wall of the buffer tube 16.

As depicted in FIG. 8, the coupling element 18 and the water-swellable element 14 are positioned adjacent to the inner wall of the buffer tube 16 between the optical fiber element 12 and the inner wall of the buffer tube 16. (The optical fiber cable embodiment depicted in FIG. 9, of course, omits a water-swellable element 14.)

In either of these particular optical fiber cable embodiments, the coupling element 18 may be a continuous or an intermittent bead of the coupling composition positioned along the length of the optical fiber element 12 (e.g., configured in a straight or helical strip). Those having ordinary skill in the art will appreciate that, in such single-bead configurations, the coupling element 18 provides somewhat less protection to the optical fiber element 12, but provides adequate coupling of the optical fiber element 12 to the buffer tube 16.

Additionally, reinforcing rods may be included to provide supplemental stiffness to the buffer tube 16, thereby inhibiting bending. The reinforcing rods, for instance, may be incorporated within the structure of the buffer tube 16. As will be known by those having ordinary skill in the art, reinforcing rods may be formed from glass-reinforced plastic. In this regard, exemplary glass-reinforced plastic (GRP) might include between about 80 and 90 weight percent glass.

As noted previously, the coupling element 18 should be configured and sized to retain a gap between the coupling element 18 and the optical fiber element 12—at least for some discrete segments along the optical fiber cable 10. In other words, the optical fiber element 12 should be capable of being positioned within the buffer tube 16 in a way that does not require contact with the coupling element 18 (i.e., capable of defining annular free space).

At any given cable cross-section that includes the coupling element 18, the coupling element 18 provides coupling area for the optical fiber element 12. See FIG. 2 (depicting a coupling space cross-section). In this regard, the concept of "nominal coupling diameter" is used herein to characterize free area available to the optical fiber element 12 within the inner region of the optical fiber cable 10 (e.g., within the coupling element 18 and the buffer tube 16).

Figure 10:
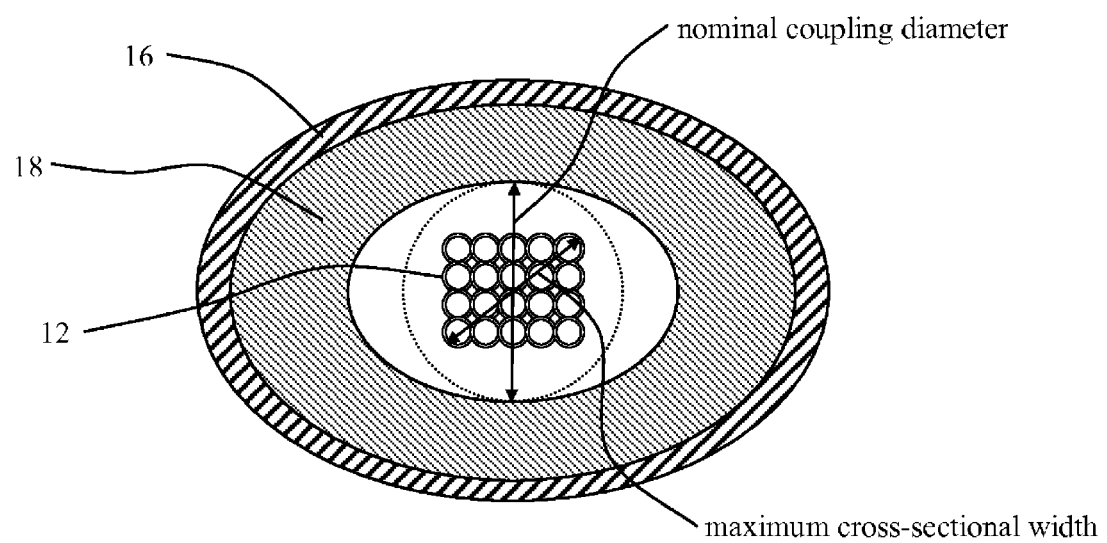
FIG. 10 depicts the nominal coupling diameter of a coupling element and the maximum cross-sectional width of an optical fiber element for an exemplary, elliptical optical fiber cable.

In particular, as used herein, the term "nominal coupling diameter" describes, at any given cable cross-section that includes the coupling element 18, the diameter of the largest circular cross-section (i.e., circle) that fits within the inner area defined by the coupling element 18 (and the buffer tube 16 or other surrounding cable components) without touching the coupling element 18. See FIG. 10. Furthermore and as used herein, a cable cross-section that does not include (i.e., intersect or otherwise traverse) the coupling element 18 does not define a nominal coupling diameter.

Likewise, the optical fiber element 12 defines a maximum cross-sectional width. As used herein, the term "maximum cross-sectional width" is meant to characterize the largest cross-sectional dimension of the optical fiber element 12. For example, for an optical fiber bundle having a circular cross-section, the maximum cross-sectional width is simply the diameter of the circle it defines. For a rectangular ribbon stack, the maximum cross-sectional width is the measurement of its diagonal.

In accordance with one embodiment of the optical fiber cable 10, at one or more cross-sections of the optical fiber cable 10, the nominal coupling diameter of the coupling element 18 is sized so that it exceeds the maximum cross-sectional width of the optical fiber element 12. In other words, along the length of the optical fiber cable 10 there is at least one cross-section in which the coupling element 18 is sized such that the optical fiber element 12 can be positioned (e.g., configured) within the buffer tube 16 (and adjacent to the coupling element 18) without contacting the coupling element 18.

In accordance with another embodiment of the optical fiber cable 10, at any cross-section of the optical fiber cable 10, the nominal coupling diameter of the coupling element 18 is sized so that it exceeds the maximum cross-sectional width of the optical fiber element 12. Stated otherwise, this embodiment describes an optical fiber cable 10 in which the optical fiber element 12 is capable of defining annular free space within the entire length of the optical fiber cable 10 (i.e., capable of contact-free placement). Those having ordinary skill in the art will appreciate that in this embodiment the optical fiber element 12 is never squeezed or otherwise subjected to compressive forces within the coupling element 18 at any point along the length of the optical fiber cable 10. In other words, the coupling element 18 protrudes into the buffer tube 16 toward the optical fiber element 12, but does not create forced contact with the optical fiber element 12. See e.g., FIGS. 3 and 10.

More generally, in either of the foregoing optical fiber cable embodiments, the coupling element 18 does not completely fill the region between the inside wall of the buffer tube 16 and the optical fiber element 12.

In yet another particular embodiment, the buffer tube 16 and coupling element 18 are sized such that, along a segment of the optical fiber cable 10 (e.g., over a meaningful length), the coupling element 18 defines a continuum of nominal coupling diameters, the average of which is greater than the maximum cross-sectional width of the optical fiber element 12.

The buffer tube 16 and coupling element 18 may further be sized such that, along a segment of the optical fiber cable 10, the minimum nominal coupling diameter of the coupling element 18 is greater than the maximum cross-sectional width of the optical fiber element 12. In other words, the maximum cross-sectional width of the optical fiber element 12 does not exceed or equal the clearance provided by (i.e., within) the coupling element 18 for that segment of the optical fiber cable 10. In this way, the coupling element 18 never causes any squeeze coupling or squeeze contact of the optical fiber element 12 along the particular segment of the optical fiber cable 10.

In either configuration, interference contact of the optical fiber element 12 with the coupling element 18 creates a shelf-like protrusion 20. This shelf-like protrusion 20 resists axial movement of the optical fiber element 12 with respect to the buffer tube 16.

Figure 11:
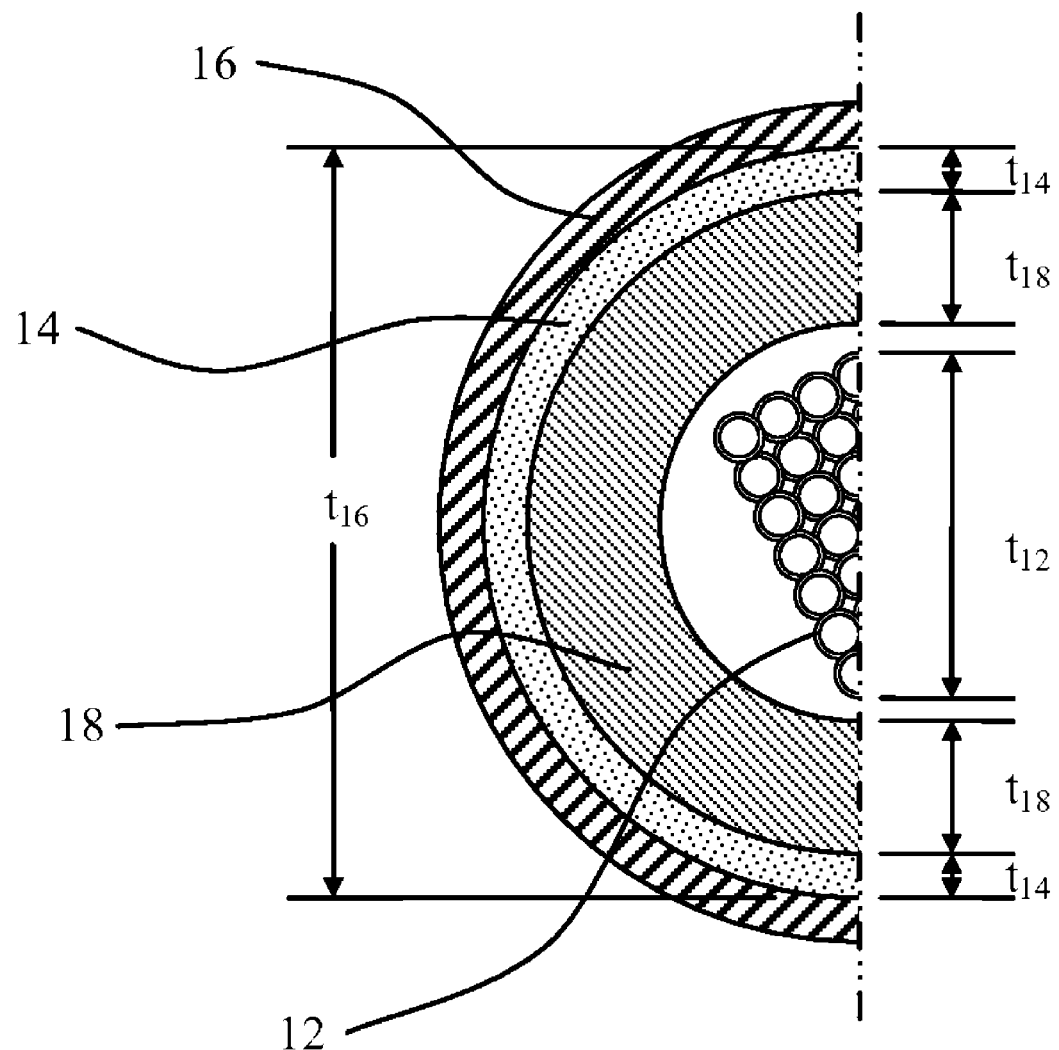
FIG. 11 depicts an exemplary optical fiber cable in which the inner diameter of the buffer tube is greater than the combined thicknesses of all elements positioned within the buffer tube (i.e., the water-swellable element, the coupling element, and the optical fiber element).

The components of the optical fiber cable 10 should be designed to ensure that the optical fiber element 12 is not squeezed or otherwise subjected to compressive forces within the coupling element 18. As illustrated in FIG. 11, for a buffer tube 16 having a specified inner diameter, the coupling element 18 should be thin enough such that the inner diameter of the buffer tube 16 is greater than the combined thicknesses of all elements within the buffer tube 16. For example, the sum of twice the thickness of the coupling element 18 (i.e., $t_{18}$), twice the thickness of any other layers within the buffer tube 16 (e.g., a water-swellable element 14), and the maximum cross-sectional width of optical fiber element 12 (i.e., $t_{12}$) should be less than the inner diameter of the buffer tube 16 (i.e., $t_{16}$). See FIG. 11. (Those having ordinary skill in the art will recognize that the thicknesses of the coupling element 18 and other layers within the buffer tube 16 are accounted for twice because these elements encircle the optical fiber element 12.)

By way of example and in view of the foregoing, a rectangular ribbon stack according to the present invention may be formed with or without a central twist (herein referred to as a "primary twist"). Those having ordinary skill in the art will appreciate that a ribbon stack is typically manufactured with rotational twist to ensure that its constituent optical fibers travel the same distance during cable winding. In either instance (i.e., with or without twist), the maximum cross-sectional width of the ribbon stack is simply its diagonal length. See FIG. 10.

In a structural variation, a twisted (or untwisted) rectangular ribbon stack may be further formed into a coil-like or a wave-like configuration (i.e., having regular "secondary" deformations). For any optical fiber element 12, these secondary configurations define an "effective maximum width."

For example, a rectangular ribbon stack may be formed into a helical configuration (i.e., a helix) in which the outermost diameter defined by the helix (i.e., its "effective maximum width") exceeds the maximum cross-sectional width of the rectangular ribbon stack. Similarly, a rectangular ribbon stack may be formed into a wave-like configuration (e.g., sinusoidal) in which the peak-to-trough measurement (i.e., its "effective maximum width" is twice its amplitude) exceeds the maximum cross-sectional width of the rectangular ribbon stack.

Accordingly, in another embodiment of the present invention, the optical fiber element 12 is configured to have regular secondary deformations such that its effective maximum width exceeds its maximum cross-sectional width. Moreover, in this embodiment, the nominal coupling diameter of the coupling element 18 is typically sized so that it exceeds the effective maximum width of the optical fiber element 12.

By way of further illustration, a twisted rectangular ribbon stack may be formed into a helical configuration such that (i) the maximum cross-sectional width of the optical fiber element 12 is less than its effective maximum width and (ii) the effective maximum width of the optical fiber element 12 is less than the nominal coupling diameter of the coupling element 18. Stated otherwise, the optical fiber element 12 (having primary twists and configured into a helix) can be positioned within the buffer tube 16 (and adjacent to the coupling element 18) such that the twisted and helical optical fiber element 12 is not in contact with the coupling element 18.

In accordance with the foregoing, in this alternative structure, the coupling element 18 provides space to account for any regular eccentric movement (e.g., helical coiling) of the optical fiber element 12 within the buffer tube 16. That is, the coupling space within the buffer tube 16 (and the coupling element 18) should accommodate the effective maximum width of the optical fiber element 12.

More typically, a twisted (or untwisted) rectangular ribbon stack may assume irregular "secondary" deformations (e.g., irregular coiling) during use (e.g., installation). Accordingly, the nominal coupling diameter of the coupling element 18 can be sized so that the coupling element 18 facilitates coupling of the optical fiber element 12 when detrimental levels of excess length occur within optical fiber cable 10. The design considerations of the optical fiber cable 10 should balance the extremes of excess length and interference contact between the optical fiber element 12 and the coupling element 18. As noted, this is principally controlled by ensuring that at one or more cross-sections of the optical fiber cable 10, the nominal coupling diameter of the coupling element 18 is sized so that it exceeds the maximum cross-sectional width of the optical fiber element 12.

Whether its secondary deformations are regular or irregular, the optical fiber element 12 typically rests on the coupling element 18 at discrete locations along the length of the optical fiber cable 10 (i.e., optical fiber element 12 most typically does not contact the coupling element 18 along the entire length of the optical fiber cable 10). These interference contacts are sufficient to support the optical fiber element 12 within the buffer tube 16. In this way, the optical fiber element 12 can move relative to the buffer tube 16 to account for the differences in the thermal expansion or contraction of the different constituent materials.

By way of example, when the buffer tube 16 contracts relative to the optical fiber element 12 due to thermal contraction or bending of the optical fiber cable 10, the difference in length between the buffer tube 16 and the optical fiber element 12 is known as "excess length." When excess length develops in the optical fiber element 12, the optical fiber element 12 may coil or bend, thereby creating interference contact with the coupling element 18. Upon such contact, the coupling element 18 supports the optical fiber element 12 by deforming to create a shelf-like protrusion 20. In response to the application of such an interference force, the coupling element 18 resists axial movement of the optical fiber element 12 within the buffer tube 16.

For instance and as noted, various conditions may cause excess length in the optical fiber element 12 to bunch, slump, gather, or otherwise collect in a small section of the buffer tube 16. For instance, for an optical fiber cable 10 oriented vertically, gravity tends to cause excess length in the optical fiber element 12, the excess length typically collecting near the bottom of the optical fiber cable 10.

Likewise, in optical fiber cables 10 that contract after having been stretched during installation or thermally expanded, the component optical fiber element 12 may tend to bunch. As depicted in FIG. 4, the coupling element 18 resists these tendencies of the optical fiber element 12 to slump by deforming to create a shelf-like protrusion 20 wherever interference contact between the optical fiber element 12 and the coupling element 18 occurs.

The coupling element 18 may embrace various forms to effectively couple the optical fiber element 12 to the buffer tube 16.

For instance, in the embodiment depicted in FIG. 1, the coupling element 18 may be a deformable yet substantially incompressible material that completely encircles the optical fiber element 12 (i.e., a circumferentially continuous layer). By completely surrounding the optical fiber element 12, this configuration ensures the buffer tube 16 and any components within the buffer tube 16 cannot exert a microbending-inducing force or macrobending-inducing force on the optical fiber element 12.

Figure 5:
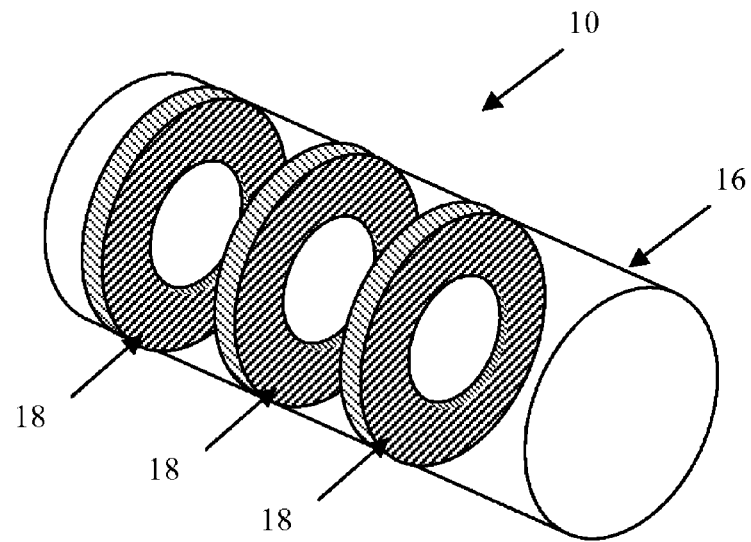
FIG. 5 depicts a perspective view of an optical fiber cable according to one embodiment of the present invention in which the coupling element is intermittently spaced along the length of the optical fiber cable. (For clarity, this figure omits the respective optical fiber element.)

The circumferentially continuous layer may be lengthwise-continuous, too, to ensure that coupling can be achieved at any point along the length of the optical fiber cable 10. Alternatively, the circumferentially continuous layer may instead be intermittently spaced along the length of the optical fiber cable 10. See FIG. 5. To account for the often non-linear orientation of the optical fiber element 12 within the buffer tube 16, the resulting intermittent rings of coupling material should be spaced closely enough to effectively engage the optical fiber element 12 regardless of how the optical fiber element 12 twists or bends within the buffer tube 16. This configuration reduces the amount of material used to form the coupling element 18 yet maintains sufficient coupling of the optical fiber element 12 to the buffer tube 16.

Furthermore, in the embodiments depicted in FIGS. 6 and 7, the coupling element 18 may be provided as a plurality of strips or beads of a deformable yet substantially incompressible material spaced around the perimeter of the optical fiber element 12 (i.e., circumferentially discontinuous). The number and spacing of the strips of material should be sufficient to effectively engage the optical fiber element 12 regardless of the orientation of the optical fiber element 12. Stated differently, the gaps between the intermittent strips should not be so great as to readily permit an irregularly coiled optical fiber element 12 to become positioned between the strips and, possibly, to contact the water-swellable element 14 or the buffer tube 16. In this configuration, less material is used to form the coupling element 18, but the coupling element 18 nonetheless provides adequate coupling of the optical fiber element 12 to the buffer tube 16.

In this circumferentially discontinuous variation, the strips or beads of deformable yet substantially incompressible material may be provided as lengthwise-continuous strips that provide uniform coupling at any point along the length of the optical fiber cable 10. Alternatively, the strips or beads may be lengthwise-discontinuous (e.g., segments of deformable yet substantially incompressible material), using only so much material as is necessary to provide the desired coupling and fiber protection.

In conjunction with these circumferentially discontinuous alternatives, the water-swellable element 14 may be provided as water-swellable strips (e.g., yarns containing water-swellable material). As depicted in FIG. 7, the water-swellable strips may be positioned between the lengthwise strips of the coupling material. This configuration uses less water-swellable materials to perform the desired water-blocking function. Further, by alternating the water-swellable element 14 and coupling element 18 about the inner surface of the buffer tube 16 rather than stacking the elements on top of each other, thinner buffer tubes may be constructed while retaining significant coupling and water-blocking functions.

The coupling element 18 can be formed and/or configured within the buffer tube 16 in various ways. For example, the coupling element 18 may be extruded onto the buffer tube 16

(or onto the water-swellable element 14, if present) so as to at least partially surround the optical fiber element 12.

In this regard, in one particular embodiment, the coupling element 18 may be co-extruded with the buffer tube 16 to not only surround the optical fiber element 12 but also bond the coupling element 18 and the buffer tube 16 together. Further, the coupling element 18, water-swellable element 14, and buffer tube 16 may all be extruded together.

In another particular embodiment, the coupling element 18 may be formed separately from the buffer tube 16 and subsequently secured to the buffer tube 16 such as by frictional coupling, by thermal bonding, or by adhesive bonding. For instance, a thermoplastic or thermoset adhesive may be applied to couple the coupling element 18 and the buffer tube 16.

As discussed previously, the coupling element 18 can be composed of materials that exhibit an elastic reaction to an applied force (e.g., polymers). In a particular embodiment, the coupling element 18 possesses water-blocking characteristics, thereby reducing if not eliminating the need for a separate water-swellable element 14.

For instance, the coupling element 18 might be formed from water-swellable materials or a blend thereof (e.g., a blend of water-swellable polymers and non-water-swellable polymers). In this regard, exemplary water-swellable materials include a matrix (e.g., ethylene vinyl acetate or rubber) enhanced with about 30-70 weight percent super absorbent polymers (SAPs), such as particulates of sodium polyacrylate, polyacrylate salt, or acrylic acid polymer with sodium salt. Such water-swellable materials can be processed on conventional hot melt adhesive machinery. An exemplary water-swellable material, which can be further blended with non-water-swellable polymeric material to enhance its elasticity, is available from the H. B. Fuller Company under the trade name HYDROLOCK.

Alternatively, the coupling element 18 can be enhanced with water-swellable particulate powders, which can be bound, for instance, to the surface of the coupling element 18, usually opposite the optical fiber element 12 to reduce the risk of optical attenuation (e.g., microbending) or glass degradation. Such powders are typically composed of super absorbent polymers (SAPs) that, when bound on or impregnated in the coupling element 18, are dry to the touch and, accordingly, are readily removed from cables during splicing operations. Moreover, the water-swellable particulate powders can be applied to the outer surface of the coupling element 18 (i.e., opposite the optical fiber element 12), either completely or partially (e.g., intermittently).

As noted, in another aspect, the invention embraces methods for making the optical fiber cable 10 as previously described.

The method typically includes forming an enclosed buffer tube 16, positioning an optical fiber element 12 having at least one optical fiber within the buffer tube 16, and positioning a coupling element 18 between the optical fiber element 12 and the buffer tube 16. The method may further include positioning a water-swellable element 14 between the coupling element 18 and the buffer tube 16.

The coupling element 18, which is typically formed from a deformable yet substantially incompressible material, is configured to define free space between the optical fiber element 12 and the coupling element 18. In this regard, the coupling element 18 is usually positioned between the optical fiber element 12 and the buffer tube 16 such that, at a cross-section of the optical fiber cable 10, the coupling element 18 defines a nominal coupling diameter that exceeds the maximum cross-sectional width of the optical fiber element 12.

In accordance with the foregoing, the step of positioning the coupling element 18 between the optical fiber element 12 and the buffer tube 16 may embrace placing a plurality of strips of deformable yet substantially incompressible material along the length of the buffer tube's internal surface 16. These strips of coupling material may be continuous or discontinuous (i.e., dash-like segments) along the length of the buffer tube 16 and further, may be intermittently spaced about the perimeter of the optical fiber element 12.

The steps of forming an enclosed buffer tube 16 and positioning an optical fiber element 12 within the buffer tube 16 may embrace, for instance, extruding the buffer tube 16 around the optical fiber element 12. Those having ordinary skill in the art will appreciate that the buffer tube 16 can be formed from various polymeric materials, such as polyethylene or polypropylene.

The step of positioning a coupling element 18 between the optical fiber element 12 and the buffer tube 16 may be achieved, for instance, by co-extruding the coupling element 18 and buffer tube 16 around the optical fiber element 12.

Further still, the steps of forming the enclosed buffer tube 16, positioning the coupling element 18 between the optical fiber element 12 and the buffer tube 16, and positioning a water-swellable element 14 between the coupling element 18 and the buffer tube 16 may involve co-extruding the outer buffer tube 16, the water-swellable element 14, and the coupling element 18 around the optical fiber element 12.

An alternate method of constructing an optical fiber cable 10 includes the step of forming a core from a substantially incompressible coupling element 18, which is placed around an optical fiber element 12 having at least one optical fiber.

In forming the core, a water-swellable element 14 may further be positioned around the coupling element 18. The core is then enclosed within a buffer tube 16 to form the optical fiber cable 10. The method may further include the step of securing the coupling element 18 to the buffer tube 16 (e.g., by applying an adhesive, by melt-bonding, or by frictional coupling).

The step of forming the core may be completed in various ways. For instance, deformable yet substantially incompressible material may be extruded around the optical fiber element 12. In another way, the coupling element 18 may be a tape of deformable yet substantially incompressible material that is bent, wrapped, or otherwise shaped to form a tube around the optical fiber element 12 (e.g., the sides of the tape may be bonded to form a convolute structure about the optical fiber element 12).

In yet another way, the steps of forming the core and enclosing the core within a buffer tube 16 may be performed together. In this regard, the coupling element 18 may be a plurality of lengthwise strips of deformable yet substantially incompressible material positioned about the cross-sectional perimeter of the optical fiber element 12 and secured to the buffer tube 16.

Regardless of how the core is formed, though, for at least one cross-section of the core, the coupling element 18 should define a nominal coupling diameter that exceeds the maximum width of the optical fiber element 12. This ensures that a gap is present with the internal region of the optical fiber cable 10.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. An optical fiber cable, comprising:
   an optical fiber element including an optical fiber ribbon stack;
   a buffer tube enclosing said optical fiber element; and
   a deformable yet substantially incompressible coupling element positioned between said optical fiber element and said buffer tube, wherein said coupling element comprises a blend of (i) elastomeric block copolymers and (ii) hydrocarbon oil;
   wherein, at a cross-section of said optical fiber cable, said coupling element defines a nominal coupling diameter; and
   wherein the nominal coupling diameter of said coupling element is greater than the maximum cross-sectional width of said optical fiber element.

2. An optical fiber cable according to claim 1, comprising a water-swellable element positioned between said coupling element and said buffer tube.

3. An optical fiber cable according to claim 1, wherein said optical fiber element is capable of being positioned within said buffer tube in a way that does not require contact with said coupling element.

4. An optical fiber cable according to claim 1, wherein said optical fiber element manifests secondary deformations, said secondary deformations defining an effective maximum width for said optical fiber element that exceeds the maximum cross-sectional width of said optical fiber element.

5. An optical fiber cable according to claim 1, wherein said coupling element possesses an elongation to break of at least about 100 percent and a tensile strength of at least about 100 psi at standard pressure and temperature.

6. An optical fiber cable according to claim 1, wherein said coupling element possesses an elongation to break of at least about 250 percent and a tensile strength of at least about 400 psi at standard pressure and temperature.

7. An optical fiber cable according to claim 1, wherein said coupling element possesses an elongation to break of at least about 500 percent and a tensile strength of at least about 1,000 psi at standard pressure and temperature.

8. An optical fiber cable according to claim 1, wherein said coupling element comprises a blend of (i) elastomeric block copolymers having an number-average molecular weight of at least about 100,000 g/mol and (ii) hydrocarbon oil possessing a pour-point of −15° C. or less and absorbability in polyethylene or polypropylene of less than 20 percent, said blend possessing a melt flow temperature of at least about 80° C.

9. An optical fiber cable according to claim 1, wherein said coupling element comprises a blend of (i) elastomeric block copolymers having an number-average molecular weight of at least about 200,000 g/mol and (ii) hydrocarbon oil possessing a pour-point of −25° C. or less and absorbability in polyethylene or polypropylene of less than 20 percent, said blend possessing a melt flow temperature of at least about 80° C.

10. An optical fiber cable according to claim 1, wherein said coupling element comprises a blend of (i) SEBS block copolymers having an number-average molecular weight of at least about 200,000 g/mol and (ii) polyalphaolefin (PAO) oil possessing a pour-point of less than about −30° C. and absorbability in polyethylene or polypropylene of less than about 15 percent.

11. An optical fiber cable according to claim 1, wherein said coupling element comprises water-swellable material.

12. An optical fiber cable according to claim 1, wherein, at any cable cross-section that includes said coupling element, the nominal coupling diameter of said coupling element is greater than the maximum cross-sectional width of said optical fiber element.

13. An optical fiber cable according to claim 1, wherein, upon interference contact between said optical fiber element and said coupling element, said coupling element deforms to create a bulge that resists axial movement of said optical fiber element with respect to said buffer tube.

14. An optical fiber cable according to claim 1, wherein, at any cable cross-section that includes said coupling element, the nominal coupling diameter of said coupling element exceeds the effective maximum width of said optical fiber element.

15. An optical fiber cable according to claim 1, wherein:
   along a segment of the optical fiber cable, said coupling element defines a continuum of nominal coupling diameters; and
   the average nominal coupling diameter of said segment of the optical fiber cable is greater than the maximum cross sectional width of said optical fiber element.

16. An optical fiber cable according to claim 1, wherein said coupling element substantially encircles said optical fiber element.

17. An optical fiber cable according to claim 1, wherein said coupling element is continuous along the length of said buffer tube.

18. An optical fiber cable according to claim 1, wherein said coupling element comprises one or more discontinuous beads of deformable yet substantially incompressible material.

* * * * *